(12) United States Patent
Ito (10) Patent No.: US 6,381,660 B1
(45) Date of Patent: Apr. 30, 2002

(54) CLOCK GENERATING SYSTEM GENERATING CLOCK BASED ON VALUE OBTAINED BY ADDING SECOND TIME INFORMATION AND DIFFERENCE BETWEEN FIRST TIME INFORMATION AND SECOND TIME INFORMATION

(75) Inventor: Tsugio Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/296,083

(22) Filed: Apr. 21, 1999

(30) Foreign Application Priority Data

Apr. 28, 1998 (JP) .......................................... 10-119237

(51) Int. Cl.[7] ........................ G06F 13/14; G06F 13/372
(52) U.S. Cl. ........................ 710/58; 713/500; 713/501; 713/502; 713/503; 386/96; 369/47
(58) Field of Search ...................... 710/1, 58; 713/500, 713/501, 502, 503; 386/96; 369/47

(56) References Cited

U.S. PATENT DOCUMENTS 5,815,634 A * 9/1998 Daum et al. .................. 386/96

6,215,742 B1 * 4/2001 Kuroda et al. ................ 369/47

* cited by examiner

*Primary Examiner*—Thomas Lee
*Assistant Examiner*—Rehana Perveen
(74) *Attorney, Agent, or Firm*—Pillsbury Winthrop LLP (57) ABSTRACT

An input device sequentially receives a first packet and a second packet that immediately follows the first packet, each of the first and second packets comprising a system time and audio data. A difference determining device determines a difference between the system time of the first packet and the system time of the second packet. A clock generating device generates a clock signal based on the system time of the first packet when the input device receives the first packet, generates a clock signal based on the system time of the second packet when the input device receives the second packet, and thereafter generates a clock signal based on a value obtained by adding the system time of the second packet and the difference between the system time of the first packet and the system time of the second packet.

18 Claims, 10 Drawing Sheets

CLOCK GENERATING SYSTEM GENERATING CLOCK BASED ON VALUE OBTAINED BY ADDING SECOND TIME INFORMATION AND DIFFERENCE BETWEEN FIRST TIME INFORMATION AND SECOND TIME INFORMATION

BACKGROUND OF THE INVENTION

1. Field of the Invention

The present invention relates to a clock generating apparatus that receives time information and generates a clock signal in accordance with the time information, and also relates to a method of generating a clock signal.

2. Prior Art

Digital serial communication according to IEEE-1394 has been widely applied in recent years. This type of communication permits packet communication, i.e., transmission of packets in which system time (time information) is added to audio data. Each of the packets includes system time and audio data.

Figure 1:
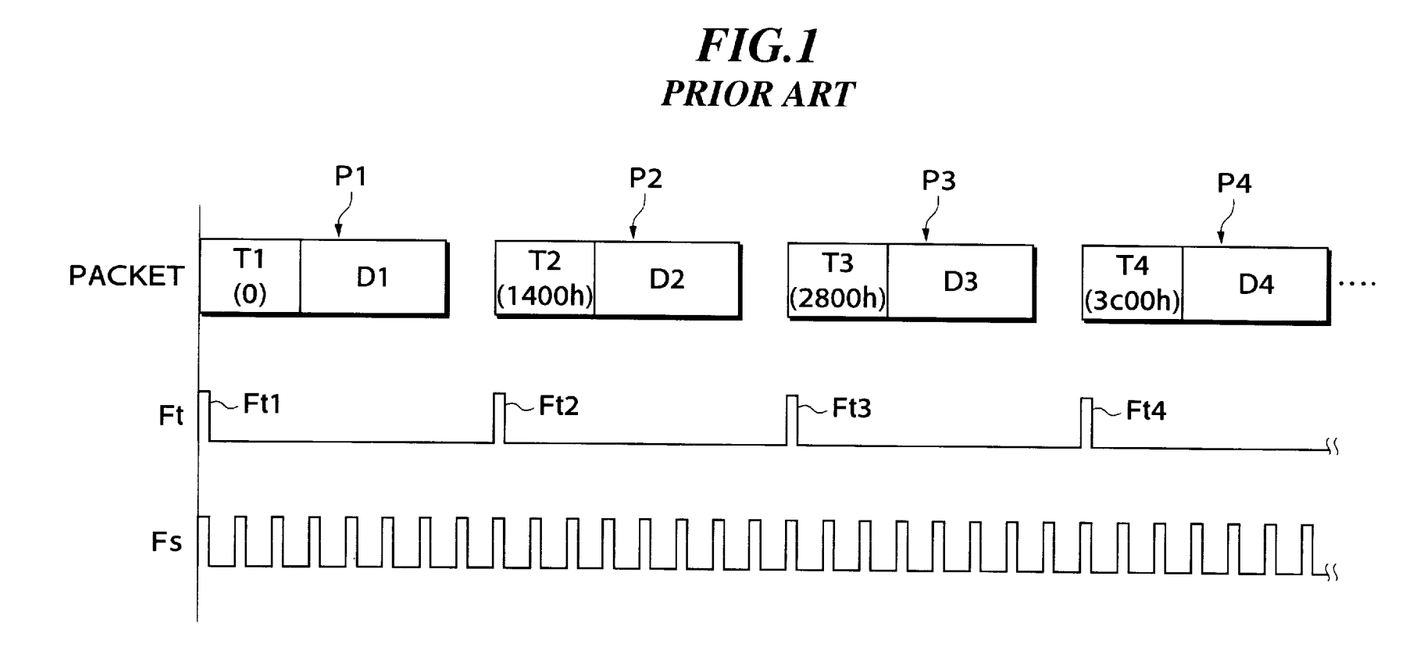
FIG. 1 is a time chart showing a conventional packet communication method.

FIG. 1 is a time chart showing a conventional packet communication method. In the example shown in FIG. 1, packet P1, packet P2, packet P3 and packet P4 are transmitted in the mentioned order. The packet P1 includes system time T1 and audio data D1, and the packet P2 includes system time T2 and audio data D2. Similarly, the packet P3 includes system time T3 and audio data D3, and the packet P4 includes system time T4 and audio data D4. In the following description, the packets P1–P4, system times T1–T4, and the audio data D1–D4 will be generally called "packet P", "system time T", and "audio data" D, respectively.

Figure 2:
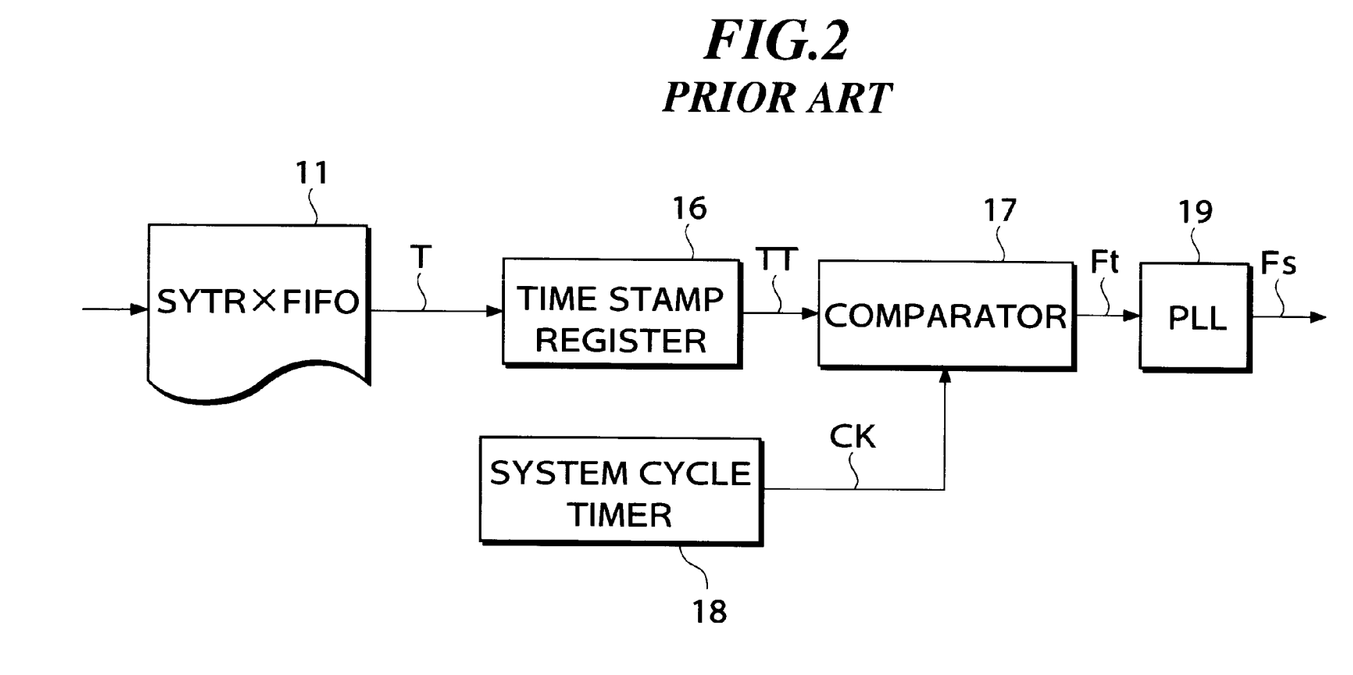
FIG. 2 is a block diagram showing the construction of a conventional receiver system.

FIG. 2 shows the construction of a conventional receiver system according to IEEE-1394. The system of FIG. 2 includes a FIFO (SYTRxFIFO) 11 for receiving the system time, which serves as a buffer that stores and outputs the system time T in the packet P in a first-in first-out manner. The audio data D in the packet P is stored in another FIFO (not illustrated).

A time stamp register 16 serves to store each system time T received from the FIFO 11, as a time stamp TT. Initially, the system time T1 of the first packet P1 is stored in the time stamp register 16.

A comparator 17 is adapted to compare the time stamp TT stored in the time stamp register 16, with a system clock signal CK generated by a system cycle timer 18, and generates a clock signal Ft, or one of pulses Ft1–Ft4 (FIG. 1), when the time stamp TT coincides with the system clock signal CK. Namely, the clock signal Ft contains individual pulses that represent the timing in which the time stamps TT are synchronized with the system clock signal CK.

The clock signal Ft has a frequency of, for example, 6 kHz. The system clock signal CK has a frequency of, for example, 24.576 MHz.

A phase lock loop (PLL) circuit 19 has a voltage-controlled oscillator (VCO), and serves to generate a word clock signal Fs (FIG. 1) comprising clock pulses that are in synchronism with the clock signal Ft. The word clock signal Fs has a frequency of, for example, 48 kHz. The audio data D contained in the packet P is reproduced in synchronism with the word clock signal Fs. Namely, the sampling frequency of the audio data D is, for example, 48 kHz.

The packet P includes system time T and audio data D. The audio data D contains eight samples (or eight blocks) of data, and its sampling frequency is, for example, 48 kHz.

The system time T corresponds to the reproduction time of the first sample data. Accordingly, the frequency of the clock signal Ft generated by the comparator 17 is 6 kHz, which is obtained by dividing the sampling frequency, 48 kHz, by eight.

The PLL 19 generates the word clock signal Fs based on the clock signal Ft. The frequency of the word clock signal Fs is eight times as high as that of the clock signal Ft, and is equal to the sampling frequency, i.e., 48 kHz.

Where the sampling frequency is 48 kHz, a difference in the value of the system time T between two successive packets P is 1400 in hexadecimal. In the following description, the hexadecimal value or number is followed by "h".

As shown in FIG. 1, the system time T1 has a value of 0, the system time T2 has a value of 1400 h, the system time T3 has a value of 2800 h, and the system time T4 has a value of 3C00h.

As described above, the packets P are transmitted at the frequency of ⅙ kHz, and therefore the pulses Ft1–Ft4 of the clock signal Ft are also generated at the frequency of ⅙ kHz. The word clock signal Fs having the frequency of 48 kHz is generated based on the clock signal Ft of 6 kHz. The audio data D is reproduced in synchronism with the word clock signal Fs.

Figure 3:
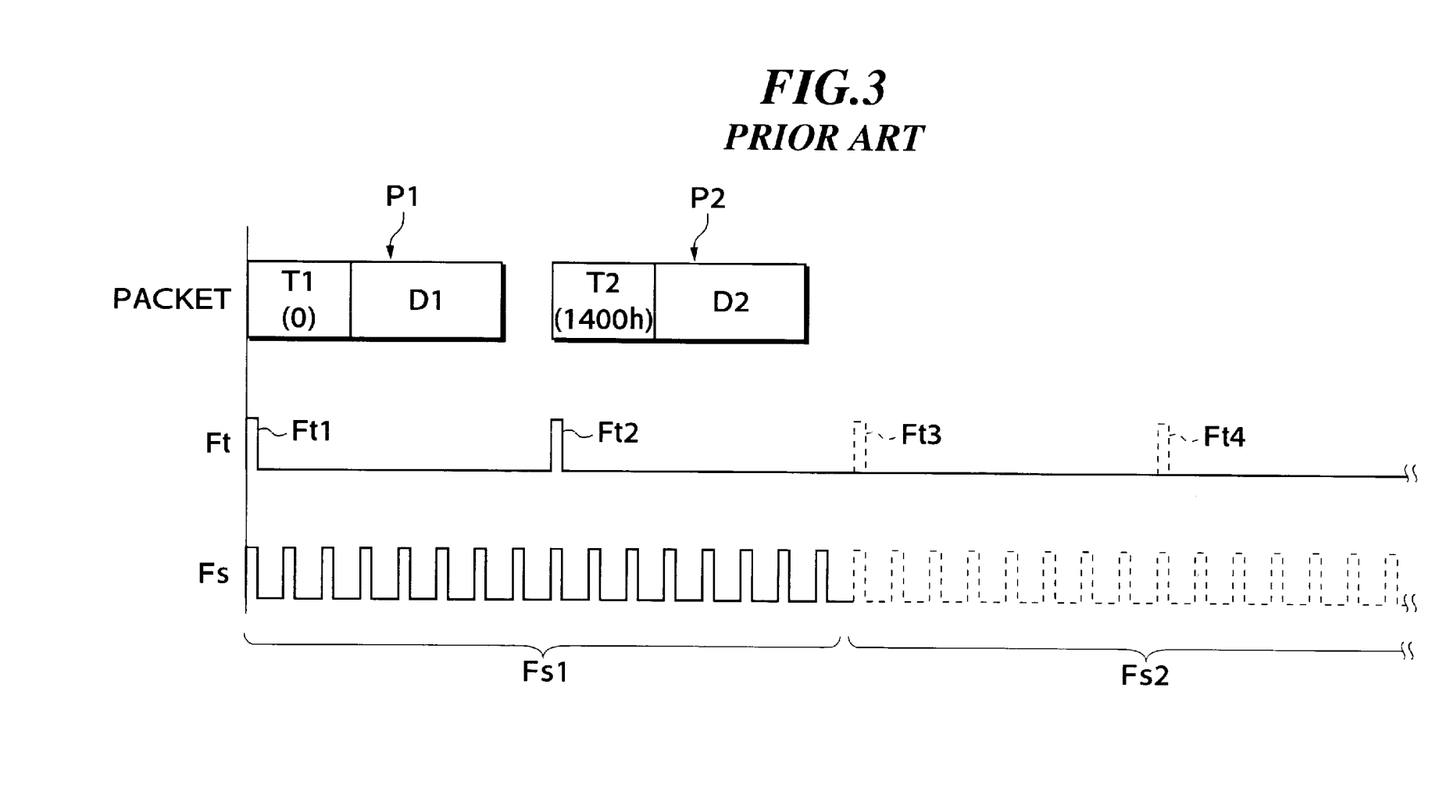
FIG. 3 is a time chart showing a conventional packet communication method when the transmission is interrupted.

FIG. 3 is a time chart showing known packet communication when a series of packets is interrupted during the communication.

Suppose no packet, such as packet P3 and packet P4 as shown in FIG. 1, follows after packet P1 and packet P2 are transmitted, and packet communication is resumed after a while. This situation may happen when the audio data D is temporarily finished, or sound corresponding to the audio data is silent.

A pulse Ft1 is generated in response to the system time T1 in the packet P1, and a pulse Ft2 is generated in response to the system time T2 in the packet P2. Since no further packet follows the packet P2, subsequent pulses (e.g., pulse Ft3 and pulse Ft4 as indicated by dotted lines in FIG. 3) are not generated.

The word clock signal Fs has a stable clock region Fs1 and an unstable clock region Fs2. The clock region Fs1 is stable since clock pulses in this region are generated in synchronism with the pulses Ft1 and Ft2. The clock region Fs2, on the other hand, is unstable since no clock pulses, such as Ft3 and Ft4 in FIG. 1, are present for synchronization with the pulses in this region Fs2. Thus, the pulses in the clock region Fs2 are shifted in phase with time, and the frequency of the work clock signal Fs changes with time.

The audio data D are processed in synchronism with the word clock signal Fs, and a processor that performs equalization, sound-field processing, and the like, produces parameters that depend upon the word clock signal Fs. If the word clock signal Fs is disturbed or comes out of phase, or the frequency of the word clock signal Fs changes, therefore, the parameters need to be re-set. In the meantime, the processor mutes audio output, or stops generating sound.

The muted state as described above occurs each time the packet communication is temporarily interrupted, or a packet receiving channel is switched from one to another, or a communication cable is plugged out or disconnected. In the case where a software of a computer is used for performing operations of transmission of packets, packet transmission may be stopped when no data to be transmitted is present. During this time, a receiver system is set to mute audio output or sound.

If muting takes place while audio data is being reproduced, sound corresponding to the audio data breaks off in the middle of reproduction, and thus the audio data cannot be reproduced as it is. Also, a listener may find reproduced sound uncomfortable upon occurrence of muting.

SUMMARY OF THE INVENTION

It is the object of the present invention to provide a clock generating apparatus that is able to generate a stable clock signal, and a method of generating such a clock signal.

To attain the above object, the present invention provides a clock generating apparatus comprising an input device that sequentially receives first time information, and second time information that is of the same type of the first time information and immediately follows the first time information, a difference determining device that determines a difference between the first time information and the second time information, and a clock generating device that generates a clock signal based on the first time information when the input device receives the first time information, generates a clock signal based on the second time information when the input device receives the second time information, and thereafter generates a clock signal based on a value obtained by adding the second time information and the difference between the first time information and the second time information.

Preferably, the clock generating device generates the clock signal based on the value obtained by adding the second time information and the difference between the first time information and the second time information, irrespective of whether time information of the same type as the first and second time information is received following the second time information.

The first time information is the first one of a series of consecutive pieces of time information that are sequentially received by the input device.

Preferably, the difference determining device obtains a first difference between two consecutive pieces of time information in a series of time information that are sequentially received by the input device, and wherein when a second difference between a current value of the first difference and a previous value of the first difference is not smaller than a predetermined value, the clock generating device generates a clock signal based on the latter one of the two consecutive pieces of time information based on which the current value of the first difference has been obtained, and thereafter generates a clock signal based on a value obtained by adding the latter one of the two consecutive pieces of time information and the current value of the first difference.

To attain the above object, the present invention provides a clock generating method comprising an input step of sequentially receiving first time information, and second time information that is of the same type of the first time information and immediately follows the first time information, a difference determining step of determining a difference between the first time information and the second time information, and a clock generating step of generating a clock signal based on the first time information when the first time information is received, generating a clock signal based on the second time information when the second time information is received, and thereafter generating a clock signal based on a value obtained by adding the second time information and the difference between the first time information and the second time information.

Preferably, the clock generating step generates the clock signal based on the value obtained by adding the second time information and the difference between the first time information and the second time information, irrespective of whether time information of the same type as the first and second time information is received following the second time information.

Preferably, the difference determining step obtains a first difference between two consecutive pieces of time information in a series of time information that are sequentially received by the input step, and when a second difference between a current value of the first difference and a previous value of the first difference is not smaller than a predetermined value, the clock generating step generates a clock signal based on the latter one of the two consecutive pieces of time information based on which the current value of the first difference has been obtained, and thereafter generates a clock signal based on a value obtained by adding the latter one of the two consecutive pieces of time information and the current value of the first difference.

In a preferred form of the invention, the clock generating apparatus comprises an input device that sequentially receives a first packet and a second packet that immediately follows the first packet, each of the first and second packets comprising a system time and audio data, a difference determining device that determines a difference between the system time of the first packet and the system time of the second packet, and a clock generating device that generates a clock signal based on the system time of the first packet when the input device receives the first packet, generates a clock signal based on the system time of the second packet when the input device receives the second packet, and thereafter generates a clock signal based on a value obtained by adding the system time of the second packet and the difference between the system time of the first packet and the system time of the second packet.

Preferably, the clock generating device generates the clock signal based on the value obtained by adding the system time of the second packet and the difference between the system time of the first packet and the system time of the second packet, irrespective of whether a packet is received following the second packet.

The first packet: is the first one of a series of consecutive packets that are sequentially received by the input device.

Preferably, the difference determining device obtains a first difference between system times of two consecutive packets in a series of packets that are sequentially received by the input device, and wherein when a second difference between a current value of the first difference and a previous value of the first difference is not smaller than a predetermined value, the clock generating device generates a clock signal based on the system time of the latter one of the two consecutive packets based on which the current value of the first difference has been obtained, and thereafter generates a clock signal based on a value obtained by adding the system time of the latter one of the two consecutive packets and the current value of the first difference.

The audio data is reproduced in synchronism with the clock signal generated by the clock generating device.

In a preferred form of the invention, the clock generating method comprises a input step of sequentially receiving a first packet and a second packet that immediately follows the first packet, each of the first and second packets comprising a system time and audio data, a difference determining step of determining a difference between the system time of the first packet and the system time of the second packet, and a clock generating step of generating a clock signal based on the system time of the first packet when the first packet is received, generating a clock signal based on the system time of the second packet when the second packet is received, and thereafter generating a clock signal based on a value obtained by adding the system time of the second packet and the difference between the system time of the first packet and the system time of the second packet.

The above and other objects, features, and advantages of the invention will become more apparent from the following detailed description taken in conjunction with the accompanying drawings.

DETAILED DESCRIPTION OF THE PREFERRED EMBODIMENT

The present invention will be described in detail with reference to the accompanying drawings showing a preferred embodiment thereof.

Figure 5:
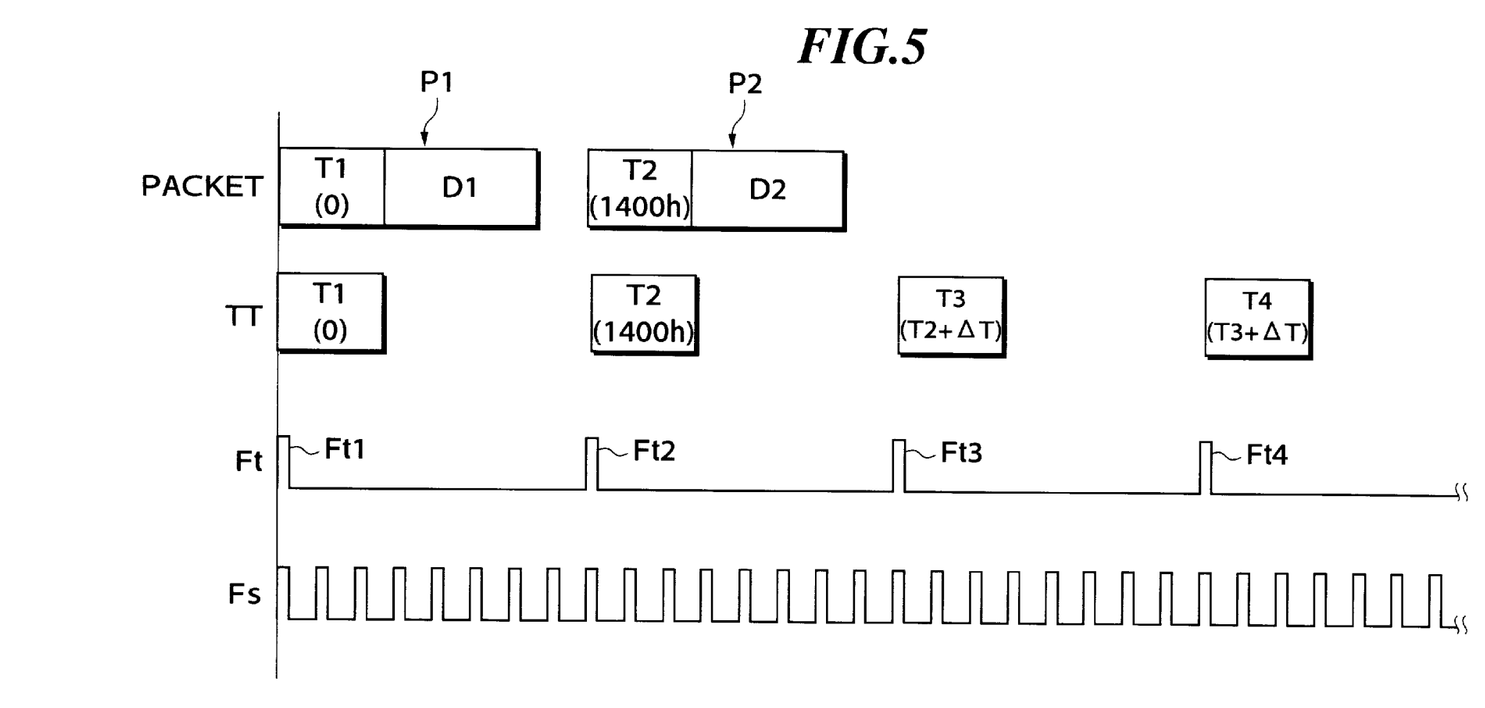
FIG. 5 is a time chart showing a packet communication method according to one embodiment of the present invention.

FIG. 5 is a time chart showing a clock generating method according to the preferred embodiment of the present invention. Here, there will be considered the case where no packet is transmitted for a while after packets P1 and P2 are transmitted, and then packet communication is resumed after the interruption, as in the case of FIG. 3.

In FIG. 5, a packet P1 includes system time T1 and audio data D1, and a packet P2 includes system time T2 and audio data D2. Where the sampling frequency of the audio data D is 48 kHz, the value of the system time T1 is 0, and the value of the system time T2 is 1400 h.

Figure 4:
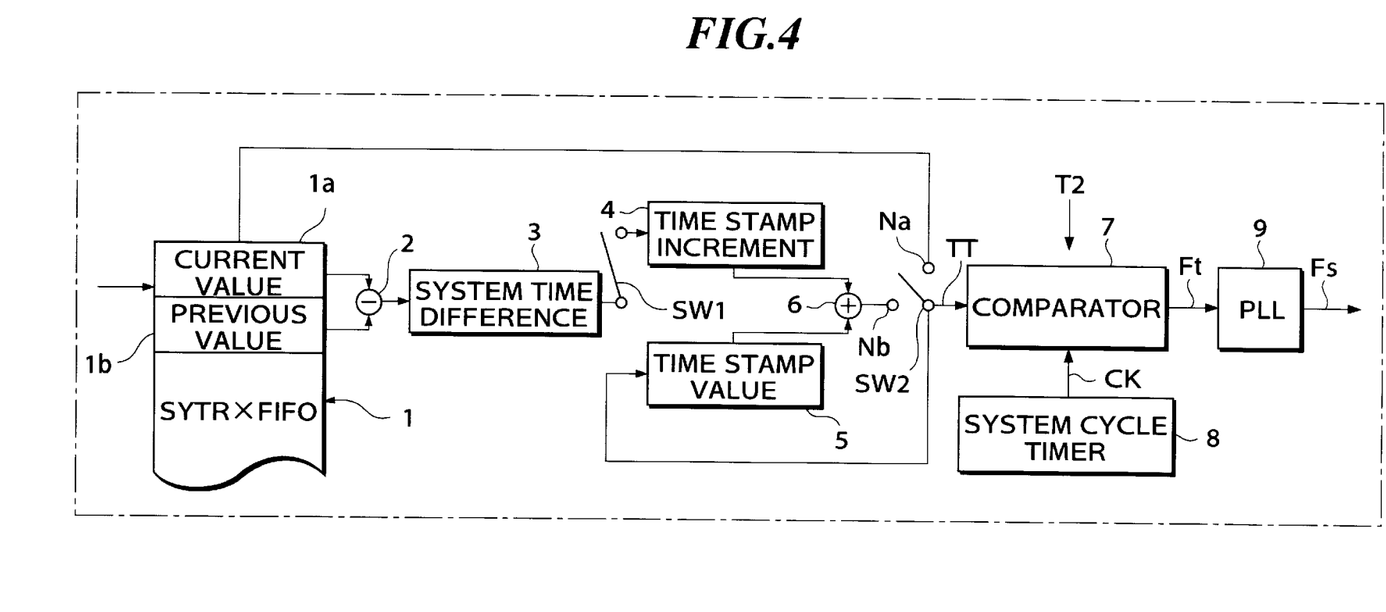
FIG. 4 is a block diagram showing the construction of a receiver system according to one embodiment of the present invention.

FIG. 4 is a block diagram showing the construction of a receiver system according to the present embodiment. The receiver system is able to receive packets in accordance with IEEE-1394.

The receiver system includes a FIFO 1 for receiving the system time, which serves as a buffer that stores and outputs the system time T in the packet P in a first-in first-out manner. The FIFO 1 includes a region 1a for storing the current (latest) system time T, and a region 1b for storing the previous (last) system time T. The audio data D in the packet P is stored in another FIFO (not illustrated).

When a switch SW2 is connected to a terminal Na, the value of the current system time T stored in the region 1a of the FIFO 1 is transmitted as a time stamp TT to a comparator 7. When the switch SW2 is connected to a terminal Nb, the output value of an adder 6 is transmitted as a time stamp TT to the comparator 7. The time stamp TT to be received by the comparator 7 is also received by a time stamp register 5. The control conditions of the switch SW2 will be described later.

A subtracter 2 subtracts the value of the previous system time stored in the region 1b of the FIFO 1 from the value of the current system time stored in the region 1a, and transmits the resulting value to a system time difference register 3. When a switch SW1 is ON or in the closed position, the value stored in the system time difference register 3 is transmitted to a time stamp increment register 4, so that the value is stored in the register 4 as a time stamp incremental value. When the switch SW1 is OFF or in the open position, the value of the time stamp increment register 4 does not change. The control conditions of the switch SW1 will be described later.

The adder 6 adds the time stamp value stored in the register 5 and the time stamp increment value stored in the register 4. When the switch SW2 is connected to the terminal Nb, the result of addition obtained by the adder 6 is transmitted as a time stamp TT to the comparator 7.

A system cycle timer 8 performs a successive counting operation at a frequency of, for example, 24.576 MHz, so as to generate a system clock signal CK having time information. The comparator 7 compares the time stamp TT and the system clock signal CK, and outputs one of clock pulses Ft1–Ft4 (FIG. 5) that constitute a clock signal Ft when the time stamp TT and system clock signal CK coincide with each other. Namely, the pulses of the clock signal Ft represent the timing in which the time stamps TT are synchronized with the system clock signal CK.

The clock signal Ft has a frequency of, for example, 6 kHz, and the system clock signal CK has a frequency of, for example, 24.576 MHz.

A phase lock loop (PLL) circuit 9 has a voltage-controlled oscillator (VCO), and serves to produce a word clock signal or pulses Fs (FIG. 2) that are in synchronism with the clock signal Ft. The word clock signal Fs has a frequency of, for example, 48 kHz. The audio data D contained in the packet P is reproduced in synchronism with the word clock signal Fs. Namely, the sampling frequency of the audio data D is the same as the frequency of the word clock signal Fs, e.g., 48 kHz.

The switch SW2 as indicated above is controlled in the following manner.

(1) When a packet is received for the first time after the power supply is turned on, the switch SW2 is connected to the terminal Na.

(2) When communication is resumed after a certain period of interruption, and a packet is received for the first time after the resumption of communication, a difference value ΔTa between the system time of the first packet received and the system time of the next (second) packet received is calculated and stored in the register 3. At this time, the previous time stamp increment value ΔTb obtained during the previous communication is stored in the register 4. Where a difference between the difference value ΔTa and the increment value ΔTb is equal to or greater than a predetermined value C1, the switch SW2 is connected to the terminal Na. Where the frequency of the word clock signal Fs is 48 kHz, the increment value ΔTb is, for example, 1400 h, and the predetermined value C1 is, for example, 10 h.

The above condition (2) is satisfied when the sampling frequency of audio data is changed after interruption of the packet communication. In this case, the time stamp incremental value stored in the register 4 based on the previous sampling frequency cannot be used, and therefore the switch SW2 is connected to the terminal Na so that the comparator 7 receives the system time in the region 1a of the FIFO 1. Where the above-described conditions (1) and (2) are not satisfied, the switch SW is connected to the terminal Nb.

The switch SW1 as indicated above is turned ON when the following condition (3) is satisfied, and turned OFF when the same condition (3) is not satisfied. (3) The previous packet and the current packet are transmitted successively or consecutively.

The above condition (3) is satisfied when the packets are received at time intervals within ⅙ kHz, for example. Whether the packets are consecutive ones or not may be determined by checking a sequence number assigned to each packet. If the sequence number of the previous packet and that of the current packet are found as being consecutive numbers, it is determined that the packets are consecutive ones.

As a specific example of judgment as to whether the packets are consecutive ones, there is known the standard of "HD Digital VCR Conference, Specification of Digital Interface for Consumer Electronic Audio/Video Equipment", which complies with IEEE-1394. This standard is a basis of standards for audio data. According to this standard, 8-bit DBC (Data Block Count) is prepared in a CIP header. The DBC is a serial counter of data blocks adapted for detecting any lack of data block. Whether certain packets are consecutive ones or not may be determined by monitoring the values of the DBC.

Occasionally, monitoring the DBC is not sufficient. For example, the DBC value of the packet obtained when the packet communication is resumed after it is once interrupted may consecutively follow the DBC value of the packet just before the interruption, namely, the DBC values just before and after the interruption may be consecutive numbers. To deal with this situation, at least one of the following two processes may be performed.

In the first process, the empty or full state of the FIFO for receiving audio data is regarded as a lack of packet, and the FIFO for receiving the system time is reset. The lack of packet means discontinuity of packets.

As the second process, isochronous packet transfer is effected according to IEEE-1394. Since this transfer requires at least one packet to be present in every isochronous cycle (125 μs), a lack of packet is determined or judged if the required packet is not present in an isochronous cycle. The lack of packet means discontinuity of packets.

By performing at least one of the above processes, it is possible to make a thorough judgment as to whether the packets are consecutive ones or not.

Referring next to FIG. 5, the operation of the circuit of FIG. 4 will be generally explained, and detailed description of the operation will be provided later with reference to FIG. 6 through FIG. 10.

When the packet P1 is initially received, the system time T1 in the packet P1 provides a time stamp TT, and a pulse Ft1 of a clock signal Ft is generated in response to the time stamp TT. Similarly, when the packet P2 is received, the system time T2 in the packet P2 provides a time stamp TT, and a pulse Ft2 of the clock signal Ft is generated in response to the time stamp TT. At this time, the system time T1 of the first packet P1 is stored in the region 1b of the FIFO 1 shown in FIG. 4, and the system time T2 of the second packet P2 is stored in the region 1a. Also, the following value ΔT is stored in the register 3 and register 4.

$$\Delta T = T2 - T1$$
$$= 1400 \text{ h} - 0$$
$$= 1400 \text{ h}$$

Although the third packet P3 is not actually received in the example of FIG. 5, a system time T3 as given below is generated as a time stamp TT at a point of time when the packet P3, if present, is supposed to be received, and a pulse Ft3 of the clock signal Ft is generated in response to the time stamp TT.

$$T3 = T2 + \Delta T$$
$$= 1400 \text{ h} + 1400 \text{ h}$$
$$= 2800 \text{ h}$$

Subsequently, a system time T4 as given below is generated as a time stamp TT at a point of time when a packet P4, if present, is supposed to be received, and a pulse Ft4 of the clock signal Ft is generated in response to the time stamp TT.

$$T4 = T3 + \Delta T$$
$$= 2800 \text{ h} + 1400 \text{ h}$$
$$= 3C00 \text{ h}$$

As a result, the word clock signal Fs provides stable clock pulses synchronous to the pulses Ft1–Ft4 of the clock signal Ft. Thereafter, similar operations are repeated, and stable clock pulses can be generated as the word clock signal Fs. Thus, even where the packets P3 and P4 are not received, the pulses Ft3 and Ft4 are generated, making it possible to generate a word clock signal Fs having stable clock pulses.

Referring next to FIG. 6 to FIG. 10, the operation of the circuit corresponding to the time chart of FIG. 5 will be now explained in detail.

Figure 6:
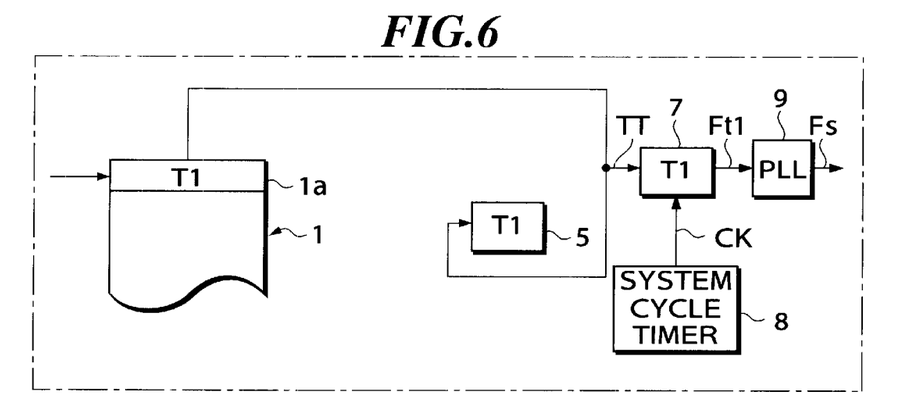
FIG. 6 is a block diagram showing the operation of the receiver system of FIG. 4.

Upon the start of the transmission of packets, the above-described condition (1) is satisfied, and the switch SW2 is connected to the terminal Na, to establish connections as shown in FIG. 6. In this state, the system time T1 is stored in the region 1a of the FIFO 1. The system time T1 in the region 1a is then transmitted as a time stamp TT to the comparator 7, and at the same time transmitted to the time stamp register 5. The comparator 7 generates a pulse Ft1 at a point of time when the time stamp T1 coincides with the system clock signal CK. The PLL 9 then generates word clock pulses Fs that are in synchronism with the pulse Ft1.

Figure 7:
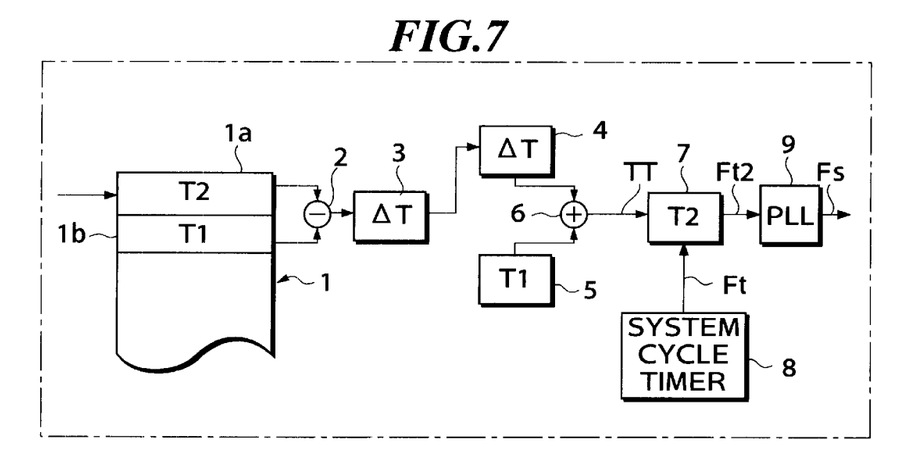
FIG. 7 is a block diagram showing the operation of the receiver system of FIG. 4, following that of FIG. 6.

Next, the switch SW1 is turned ON or closed, and the switch SW 2 is connected to the terminal Nb, to establish connections as shown in FIG. 7. In this state, the system time T1 is stored in the region 1b of the FIFO 1, and the system time T2 of the next packet P2 is stored in the region 1a. A difference value ΔT (=T2−T1) of the system time is then stored in the register 3. The difference value ΔT in the register 3 is then transmitted to and stored in the register 4 as a time stamp incremental value.

The adder 6 adds the incremental value ΔT in the register 4 and the time stamp T1 in the register 5, and transmits the result T2=T1+ΔT as a time stamp TT to the comparator 7. The comparator 7 then generates a pulse Ft2 of the clock signal Ft when the time stamp T2 coincides with the system clock signal CK. The PLL 9 then generates word clock pulses Fs that are in synchronization with the pulse Ft2.

Figure 8:
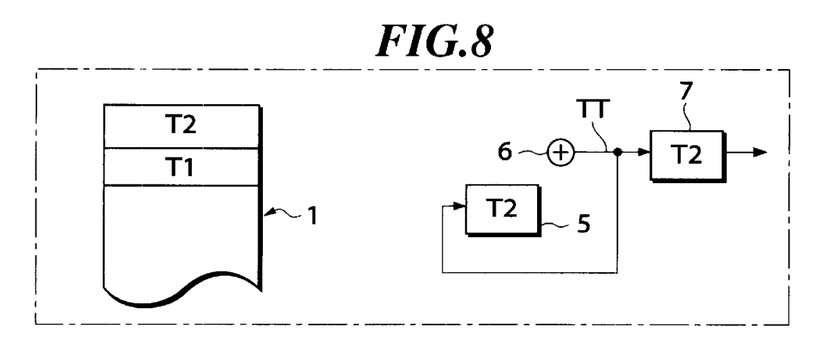
FIG. 8 is a block diagram showing the operation of the receiver system of FIG. 4, following that of FIG. 7.

The above-indicated time stamp TT (T2) is received by the comparator 7, and also received by the register 5, as shown in FIG. 8.

Figure 9:
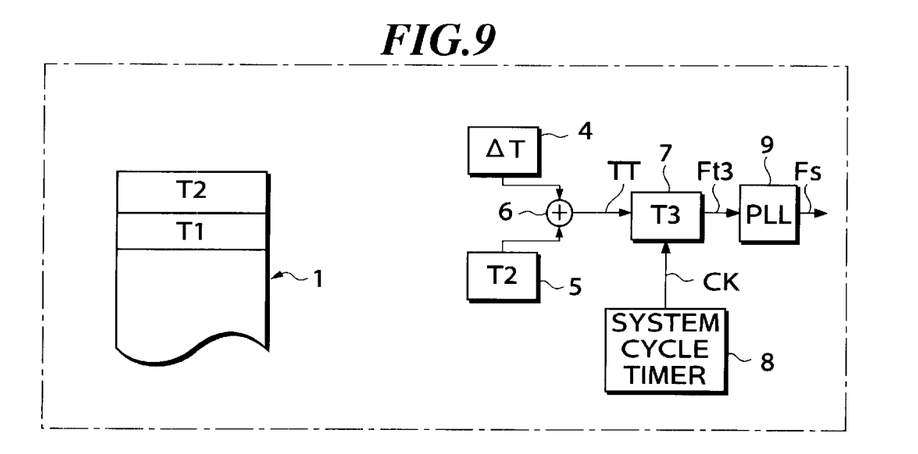
FIG. 9 is a block diagram showing the operation of the receiver system of FIG. 4, following that of FIG. 8.

Subsequently, the switch SW2 is connected to the terminal Nb at a point of time when the packet P3 is to be received. As shown in FIG. 9, the adder 6 adds the incremental value ΔT in the register 4 and the time stamp T2 in the register 5, and transmits the result T3=T2+ΔT as a time stamp TT to the comparator 7. The comparator 7 then generates a pulse Ft3 of the clock signal Ft when the time stamp T3 coincides with the system clock signal CK. The PLL 9 then generates word clock pulses Fs in synchronization with the pulse Ft3.

Figure 10:
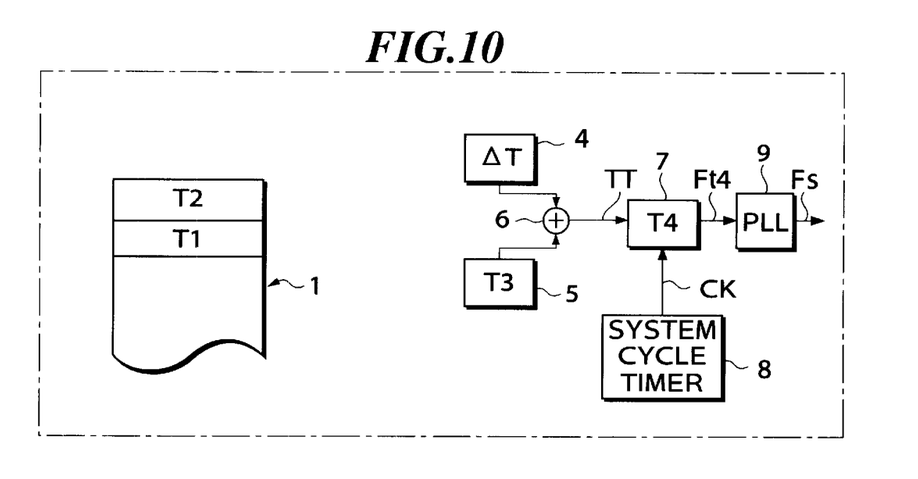
FIG. 10 is a block diagram showing the operation of the receiver system of FIG. 4, following that of FIG. 9.

The switch SW2 is kept being connected with the terminal Nb at a point of time when the packet P4 is to be received. The time stamp T3 is transmitted to and stored in the register 5, in the same manner as in FIG. 8. As shown in FIG. 10, the adder 6 adds the incremental value ΔT in the register 4 and the time stamp T3 in the register 5, in the same manner as in FIG. 9, and transmits the result T4=T3+ΔT as a time stamp TT to the comparator 7. The comparator 7 then generates a pulse Ft4 of the clock signal Ft at a point of time when the time stamp T4 coincides with the system clock signal CK. The PLL 9 then generates word clock pulses Fs in synchronism with the pulse Ft4.

Figure 11:
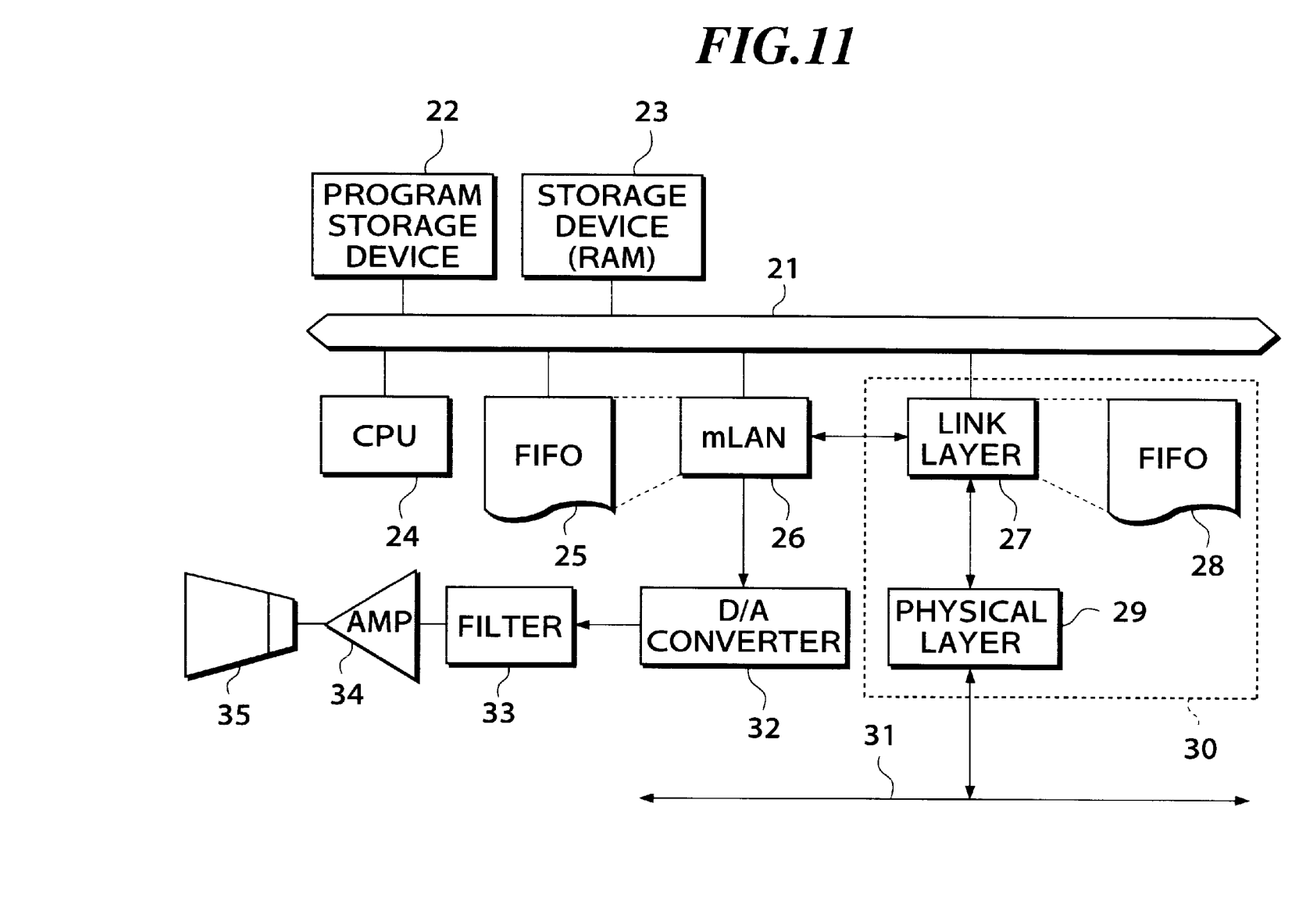
FIG. 11 is a block diagram showing the hardware configuration of the receiver system.

FIG. 11 shows the specific hardware configuration of the receiver system of the present embodiment as described above.

The receiver system includes a program storage device 22, storage device (RAM) 23, CPU 24, audio communication LSI (mLAN) 26, and IEEE-1394 communication interface 30, all of which are connected to a bus 21.

The IEEE-1394 communication interface 30 includes a physical layer 29 and a link layer 27. The physical layer 29 is connected to an external serial bus 31, and is able to transmit and receive packets through the serial bus 31. The link layer 27 includes a FIFO 28, and is connected to the physical layer 29, LSI 26, and the bus 21. The FIFO 28 stores packets received through the physical layer 29, and outputs the packets in the first-in first-out manner.

Figure 12:
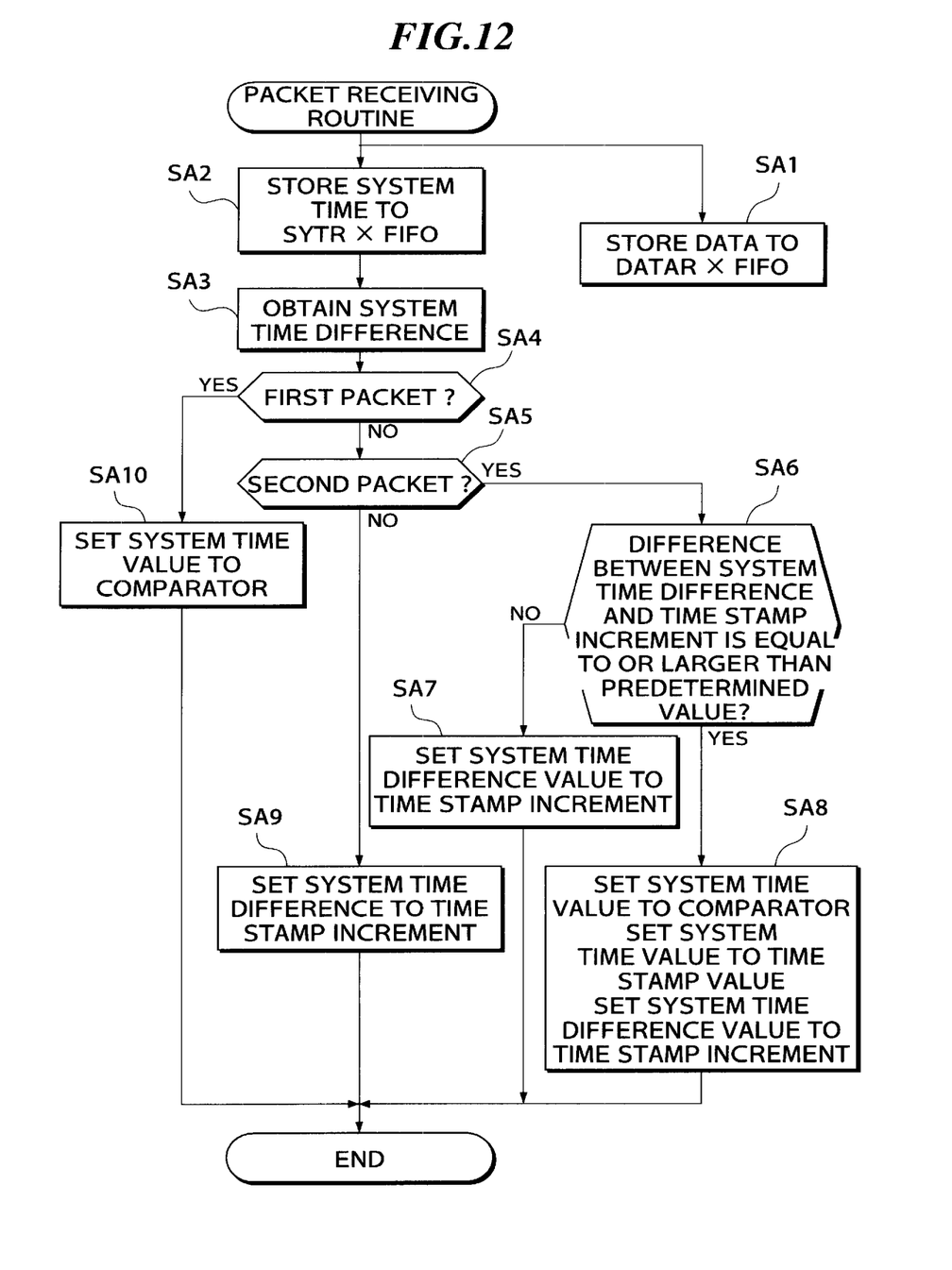
FIG. 12 is a flowchart showing a control routine for receiving packets.
Figure 13:
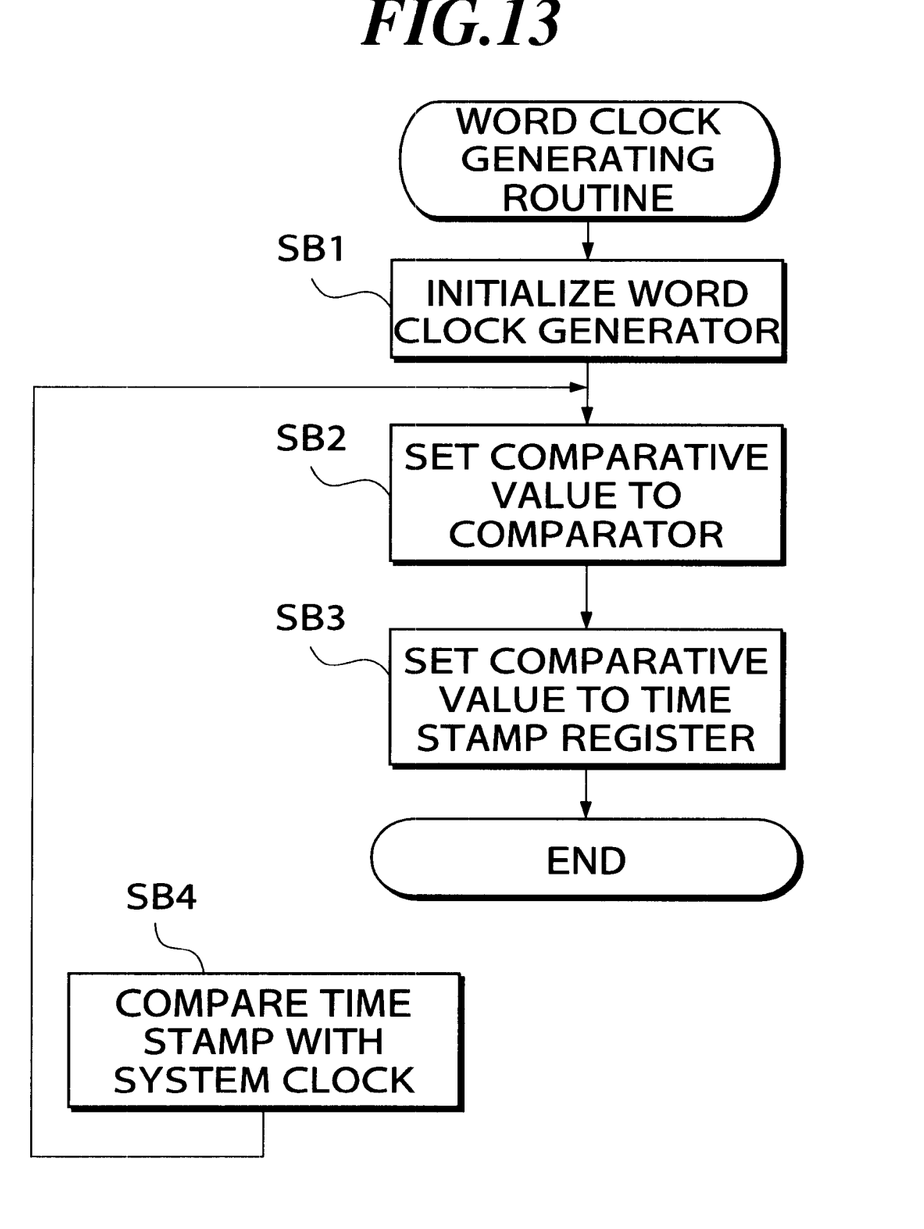
FIG. 13 is a flowchart showing a control routine executed by a word clock generator.

The LSI 26 includes a FIFO 25, and has the circuit arrangement of FIG. 4. The circuit of FIG. 4 may be constructed by a hardware or a software. FIG. 12 and FIG. 13 show a flowchart showing control routines to be executed by the software. The control routines of FIGS. 12 and 13 will be described in detail later.

The FIFO 25 corresponds to the FIFO 1 of FIG. 4, and has substantially the same functions as the FIFO 28 of the communication interface 30. The FIFO 25 includes a FIFO for storing the system time, and a FIFO for storing audio data.

The LSI 26 produces a word clock signal Fs, and outputs audio data to a. D/A converter 32 in synchronism with the word clock signal Fs. The D/A converter 32 converts the audio data in a digital form into corresponding data in an analog form, and outputs the resulting analog data to a filter 33.

The filter 33 performs filtering on the audio data thus received, and outputs the resulting data to an amplifier 34. The amplifier 34 amplifies the audio data and outputs it to a loudspeaker 35. The loudspeaker 35 then generates sound in accordance with the audio data.

FIG. 12 is a flowchart showing a control routine for receiving packets.

Upon receipt of a packet, step SA1 is executed to store audio data contained in the packet, in the FIFO (DATARx FIFO) for receiving data, and step SA2 is executed to store system time contained in the packet, in the FIFO (SYTRx FIFO) for receiving system time.

In step SA3, a difference between the system time of the packet currently received and the system time of the previous packet is obtained. If the currently received packet is the first packet, no previous packet exists, and therefore the operation of step SA3 need not be performed. When receiving the second and following packets, the system time received in the previous control cycle is subtracted from the system time received in the current cycle, so as to produce a difference value ΔTa of the system time, which is then stored in the register 3.

Step SA4 is then executed to check if the received packet is the first packet P1 or not. The received packet is regarded as the first packet not only when it is the first packet received after turn-on of the power supply, but also when it is the first packet received after packet transmission is resumed after it is interrupted for a while. Whether the received packet is the first packet or not may be determined by, for example, checking the sequence number assigned to the packet, as described above.

Where step SA3 determines that the received packet is the first packet, the control flow goes to step SA10 in which the switch SW2 is connected to the terminal Na, and the system time in the region 1a of the FIFO 1 is set into the comparator 7. Thereafter, the current cycle of the packet receiving routine is terminated.

Where step SA3 determines that the received packet is not the first packet, the control flow goes to step SA5 to determine if the received packet is the second packet or not. The control flow goes to step SA6 if the received packet is the second packet, and goes to step SA9 if a negative decision (NO) is obtained in step SA5. In step SA9, the switch SW1 is turned ON, and the system time differential value ΔTa in the register 3 is stored as a time stamp incremental value ΔTb in the register 4, and thereafter the current cycle of the packet receiving routine is finished.

In step SA6, it is determined whether a difference between the system difference value ΔTa in the register 3 and the time stamp incremental value ΔTb in the register 4 is equal to or greater than a predetermined value C1 (for example, 10 h). Upon initialization of the system, the time stamp increment value ΔTb in the register 4 is set to, for example, 1400 h.

Where the difference between the difference value ΔTa and the incremental value ΔTb is smaller than the predetermined value C1, which means that the sampling frequency of audio data has not changed, the control flow goes to step SA7. When the difference is equal to or greater than the predetermined value C1, which means that the sampling frequency of the audio data has changed, the control flow goes to step SA8.

In step SA7, the switch SW1 is turned ON, and the system time difference value ΔTa in the register 3 is transmitted to the register 4 and stored as a time stamp incremental value ΔTb, and thereafter the current cycle of the control routine is terminated. In the subsequent cycles, the adder 6 adds this time stamp incremental value ΔTb and the time stamp in the register 5, so as to provide a time stamp TT.

The above step SA7 need not be executed in every cycle. Namely, since the sampling frequency of the audio data has not changed, there is no need to update the time stamp incremental value ΔTb in the register 4. The difference between the incremental values ΔTb before and after updating is less than the predetermined value C1.

Step SA8 is executed where the sampling frequency of the audio data has changed. In this step, the switch SW2 is connected to the terminal Na, and the switch SW1 is turned ON.

By connecting the switch SW2 to the terminal Na, the system time in the region 1a of the FIFO 1 is set into the comparator 7, and also set into the register 5. By turning on the switch SW1, the system time difference value ΔTa in the register 3 is transmitted to the register 4 and stored as a time stamp incremental value ΔTb in the register 4, and thereafter the current cycle of the present routine is finished. Where the sampling frequency has changed, there is a need to update the time stamp incremental value ΔTb in this manner. In the subsequent cycles, the adder 6 adds the updated time stamp incremental value ΔTb and the time stamp in the register 4, so as to provide a time stamp TT.

The comparator 7 generates a clock signal Ft based on the time stamps TT produced in the above-described control routine, and the PLL 9 generates a word clock signal Fs based on the clock signal Ft. The details of this operation will be described later with reference to the flowchart of FIG. 13.

Here, the D/A converter 32 (FIG. 11), an equalizer and other processors may operate only with a word clock signal Fs having a certain frequency, for example, 48 kHz. In this case, a care must be taken of the frequency of the word clock signal Fs.

Namely, where the D/A converter 32 and other processors are not able to operate with the sampling frequency (e.g., 50 kHz) of the received audio data, the PLL 9 does not generate a word clock signal Fs having the same frequency as the sampling frequency, but may generate a word clock signal Fs having a suitable frequency, for example, 48 kHz, at which the D/A converter 32 and other processors are operable.

For example, an additional step may be provided before step SA9, so as to check if the system time difference value ΔTa stored in the register 3 corresponds to the operable frequency (for example, 48 kHz). Step SA9 is executed if the difference value ΔTa corresponds to the operable frequency, and step SA9 is not executed and the current cycle is terminated if the difference value ΔTa does not correspond to the operable frequency. Consequently, the time stamp incremental value ΔTb is not updated, and the previous condition is maintained, thus enabling the PLL 9 to keep generating a word clock signal Fs having the operable frequency (for example, 48 kHz).

FIG. 13 is a flowchart showing a control routine to be executed by a word clock generator.

Step SB1 is first executed to perform initialization of the word clock generator. More specifically, a time stamp incremental value ΔTb (for example, 1400 h) based on the standard sampling frequency (for example, 48 kHz) is set in the register 4 as the initial value. Also, a current timer value of the system cycle timer 8 is set in the register 5.

Step SB2 is then executed to set a time stamp (comparative value) TT into the comparator 7. The time stamp TT is either a system time value stored in the region 1a of the FIFO 1 or a value (result of addition) obtained by the adder 6.

Step SB3 is then executed to set the time stamp TT into the time stamp resister 5, and the current cycle of the present routine is finished.

Thereafter, step SB4 is executed to compare the time stamp TT with the system clock signal CK, and generates a pulse of the clock signal Ft each time the time stamp TT coincides with the system clock signal CK, and the above-described steps SB2 and SB3 are repeatedly executed.

In response to the clock signal Ft received from the comparator 7, the PLL 9 generates a word clock signal Fs in synchronism with the clock signal Ft.

As described above, when the first packet in a stream of packets is received, word clock pulses Fs are generated based on the system time contained in the packet, and in the subsequent cycles, word clock pulses Fs are generated based on a difference between the system time in the previously received packet and the system time in the currently received packet. When the stream of packets is interrupted, word clock pulses Fs are generated based on a difference between the system times of the two consecutive packets received just before the interruption. In this manner, a word clock signal containing stable pulses can be generated even where the stream of the packets is interrupted.

A processor that performs equalization, sound-field processing, and the like, produces parameters that depend upon the word clock signal Fs. If the word clock signal Fs is disturbed, therefore, the parameters need to be reset or set to new values. During resetting, the processor may mute audio output (i.e., stop generating sound).

Since stable pulses can be produced as a work clock signal Fs in the present embodiment, the above problem of muting can be prevented. Namely, muting can be prevented from occurring during reproduction of audio data, and thus the audio data can be reproduced as it is.

The data contained in the packet is not limited to audio data, but may be image data, or other type of data. The communication is not limited to IEEE-1394 digital serial communication, but may be other type of serial communication or parallel communication. For example, the communication may be implemented through Internet, LAN, or the like.

While the present invention has been explained in the illustrated embodiment, by way of example, it is to be understood that the invention is not limited to details of the embodiment, but may be otherwise embodied with various modifications, improvements and combinations, without departing from the principle of the present invention.

What is claimed is:

1. A clock generating apparatus comprising:
   an input device that sequentially receives first time information, and second time information that is of the same type of the first time information and immediately follows the first time information;
   a difference determining device that determines a difference between the first time information and the second time information; and
   a clock generating device that generates a clock signal based on the first time information when said input device receives the first time information, generates a clock signal based on the second time information when the input device receives the second time information, and thereafter generates a clock signal based on a value obtained by adding the second time information and said difference between the first time information and the second time information.

2. A clock generating apparatus according to claim 1, wherein said clock generating device generates the clock signal based on the value obtained by adding the second time information and said difference between the first time information and the second time information, irrespective of whether time information of the same type as the first and second time information is received following the second time information.

3. A clock generating apparatus according to claim 1, wherein said first time information is the first one of a series of consecutive pieces of time information that are sequentially received by said input device.

4. A clock generating apparatus according to claim 1, wherein said difference determining device obtains a first difference between two consecutive pieces of time information in a series of time information that are sequentially received by said input device, and wherein when a second difference between a current value of the first difference and a previous value of the first difference is not smaller than a predetermined value, said clock generating device generates a clock signal based on the latter one of the two consecutive pieces of time information based on which the current value of the first difference has been obtained, and thereafter generates a clock signal based on a value obtained by adding the latter one of the two consecutive pieces of time information and said current value of the first difference.

5. A clock generating method comprising:

an input step of sequentially receiving first time information, and second time information that is of the same type of the first time information and immediately follows the first time information;

a difference determining step of determining a difference between the first time information and the second time information; and a clock generating step of generating a clock signal based on the first time information when the first time information is received, generating a clock signal based on the second time information when the second time information is received, and thereafter generating a clock signal based on a value obtained by adding the second time information and said difference between the first time information and the second time information.

6. A clock generating method according to claim 5, wherein said clock generating step generates the clock signal based on the value obtained by adding the second time information and said difference between the first time information and the second time information, irrespective of whether time information of the same type as the first and second time information is received following the second time information.

7. A clock generating method according to claim 5, wherein said first time information is the first one of a series of consecutive pieces of time information that are sequentially received.

8. A clock generating method according to claim 5, wherein said difference determining step obtains a first difference between two consecutive pieces of time information in a series of time information that are sequentially received by said input step, and when a second difference between a current value of the first difference and a previous value of the first difference is not smaller than a predetermined value, said clock generating step generates a clock signal based on the latter one of said two consecutive pieces of time information based on which the current value of the first difference has been obtained, and thereafter generates a clock signal based on a value obtained by adding the latter one of the two consecutive pieces of time information and said current value of the first difference.

9. A clock generating apparatus comprising:

an input device that sequentially receives a first packet and a second packet that immediately follows the first packet, each of said first and second packets comprising a system time and audio data;

a difference determining device that determines a difference between the system time of the first packet and the system time of the second packet; and a clock generating device that generates a clock signal based on the system time of the first packet when said input device receives the first packet, generates a clock signal based on the system time of the second packet when the input device receives the second packet, and thereafter generates a clock signal based on a value obtained by adding the system time of the second packet and said difference between the system time of the first packet and the system time of the second packet.

10. A clock generating apparatus according to claim 9, wherein said clock generating device generates the clock signal based on the value obtained by adding the system time of the second packet and said difference between the system time of the first packet and the system time of the second packet, irrespective of whether a packet is received following the second packet.

11. A clock generating apparatus according to claim 9, wherein said first packet is the first one of a series of consecutive packets that are sequentially received by said input device.

12. A clock generating apparatus according to claim 9, wherein said difference determining device obtains a first difference between system times of two consecutive packets in a series of packets that are sequentially received by said input device, and wherein when a second difference between a current value of said first difference and a previous value of the first difference is not smaller than a predetermined value, said clock generating device generates a clock signal based on the system time of the latter one of said two consecutive packets based on which the current value of the first difference has been obtained, and thereafter generates a clock signal based on a value obtained by adding the system time of the latter one of the two consecutive packets and the current value of the first difference.

13. A clock generating apparatus according to claim 9, wherein said audio data is reproduced in synchronism with the clock signal generated by said clock generating device.

14. A clock generating method comprising:

a input step of sequentially receiving a first packet and a second packet that immediately follows the first packet, each of said first and second packets comprising a system time and audio data;

a difference determining step of determining a difference between the system time of the first packet and the system time of the second packet; and a clock generating step of generating a clock signal based on the system time of the first packet when the first packet is received, generating a clock signal based on the system time of the second packet when the second packet is received, and thereafter generating a clock signal based on a value obtained by adding the system time of the second packet and said difference between the system time of the first packet and the system time of the second packet.

15. A clock generating method according to claim 14, wherein said clock generating step generates the clock signal based on the value obtained by adding the system time of the second packet and said difference, irrespective of whether a packet is received following the second packet.

16. A clock generating method according to claim 14, wherein said first packet is the first one of a series of consecutive packets that are sequentially received.

17. A clock generating method according to claim 14, wherein said difference determining step obtains a first difference between system times of two consecutive packets in a series of packets that are sequentially received by said input step, and when a difference is between a current value of said first difference and a previous value of the first difference is not smaller than a predetermined value, said clock generating step generates a clock signal based on the system time of the latter one of the two consecutive packets based on which the current value of the first difference has been obtained, and thereafter generates a clock signal based on a value obtained by adding the system time of the latter one of the two consecutive packets and the current value of the first difference.

18. A clock generating method according to claim 14, wherein said audio data is reproduced in synchronism with the clock signal generated by said clock generating step.

\* \* \* \* \*